United States Patent
Lee et al.

(10) Patent No.: US 8,952,664 B2
(45) Date of Patent: Feb. 10, 2015

(54) APPARATUS FOR WAKING UP MULTI-BMS

(71) Applicant: LG Chem, Ltd., Seoul (KR)

(72) Inventors: Hyun-Chul Lee, Daejeon (KR); Jin-Seok Heo, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/230,901

(22) Filed: Mar. 31, 2014

(65) Prior Publication Data

US 2014/0210420 A1  Jul. 31, 2014

Related U.S. Application Data

(63) Continuation of application No. PCT/KR2013/008747, filed on Sep. 30, 2013.

(30) Foreign Application Priority Data

Oct. 4, 2012  (KR) .......................... 10-2012-0110132

(51) Int. Cl.
*H02J 7/00* (2006.01)
*H02J 7/04* (2006.01)

(52) U.S. Cl.
CPC ...... *H02J 7/0068* (2013.01); *H02J 7/04* (2013.01)
USPC .......................................... 320/134; 320/136

(58) Field of Classification Search
USPC ............................................. 320/134
See application file for complete search history.

(56) References Cited

U.S. PATENT DOCUMENTS

| 2009/0146610 A1 | 6/2009 | Trigiani |
| 2010/0052615 A1 | 3/2010 | Loncarevic |
| 2011/0291618 A1 | 12/2011 | Li |
| 2013/0066572 A1 | 3/2013 | Terashima et al. |

FOREIGN PATENT DOCUMENTS

| JP | 2011-182558 A | 9/2011 |
| KR | 10-2011-0027189 A | 3/2011 |

OTHER PUBLICATIONS

Written Opinion of the International Searching Authority, issued in PCT/KR2013/008747 dated Nov. 27, 2013.

*Primary Examiner* — Drew A Dunn
*Assistant Examiner* — Robert Grant
(74) *Attorney, Agent, or Firm* — Birch, Stewart, Kolasch & Birch, LLP

(57) ABSTRACT

Disclosed is an apparatus for waking up a multi-BMS of a battery pack. The apparatus for waking up a multi-BMS of a battery pack according to the present disclosure transmits a wakeup signal outputted from a master BMS to N slave BMSs to wake up the N slave BMSs managing each battery module in the battery pack, and an isolator is connected on a series line used to the wakeup signal, and turns on by the wakeup signal outputted from the master BMS and enables N−1 transistors each connected on the series line to turn on. According to the present disclosure, the signal for waking up the plurality of slave BMSs may be transmitted by using a small number of isolators. Therefore, the BMS or the battery pack may reduce in costs.

10 Claims, 3 Drawing Sheets

APPARATUS FOR WAKING UP MULTI-BMS

CROSS-REFERENCE TO RELATED APPLICATION

The present application is a continuation of International Application No. PCT/KR2013/008747 filed on Sep. 30, 2013, which claims priority to Korean Patent Application No. 10-2012-0110132 filed in the Republic of Korea on Oct. 4, 2012, the disclosures of which are incorporated herein by reference.

TECHNICAL FIELD

The present disclosure relates to an apparatus for transmitting a signal for waking up a battery management system (BMS), and more particularly, to an apparatus for transmitting a wakeup signal outputted from a master BMS to each slave BMS in a battery pack having a multi-BMS structure.

BACKGROUND ART

Due to its characteristics of being easily applicable to various products and electrical characteristics such as a high energy density, a secondary battery is not only commonly applied to a portable equipment, but universally applied to an electric vehicle (EV), a hybrid vehicle (HV), or an energy storage system that is propelled by an electric motor. This secondary battery is gaining attention for its primary advantage of remarkably reducing the use of fossil fuels and not generating by-products from the use of energy, making it a new eco-friendly and energy efficient source of energy.

A secondary battery can be charged and discharged repeatedly by an electrochemical reaction between elements including a cathode current collector, an anode current collector, a separator, an active material, an electrolyte solution, and the like. By way of example, a widely used lithium polymer secondary battery has an operating voltage in a range of about 3.7V to about 4.2V. Accordingly, to obtain a high output battery pack for use in an electric vehicle, a plurality of unit secondary battery cells are connected in series to construct a battery pack.

In addition to this basic structure, the battery pack further includes a battery management system (BMS) to monitor and control a state of a secondary battery by applying an algorithm for control of power supply to a driving load such as a motor or the like, measurement of electrical characteristics such as current or voltage, charge/discharge control, voltage equalization control, state of charge (SOC) estimation, and the like.

Recently, with the increasing need for a high-capacity structure as well as utilization as an energy storage source, the demand for a battery pack of a multi-module structure in which a plurality of battery modules including a plurality of secondary battery cells are assembled, is also increasing.

Because the battery pack of the multi-module structure includes a plurality of secondary battery cells, there is a limitation in controlling the charge/discharge state of all the secondary battery cells using a single BMS. Accordingly, a recent technology has been introduced in which a BMS is provided to each battery module included in the battery pack, the BMSs are designated as a slave BMS, and an additional BMS is provided as a master BMS to control the slave BMSs, such that the charge and discharge of each battery module is controlled in a master-slave mode. The slave BMS stands by in a sleep mode during a normal state, and wakes up by a control signal from the master BMS.

FIG. 1 is a schematic circuit diagram illustrating a wakeup apparatus 13 to transmit a wakeup signal outputted from a master BMS 11 to a slave BMS 12 according to a conventional art.

Referring to FIG. 1, a plurality of battery modules 14 are connected in series to construct a battery pack 15, and each battery module 14 is connected to the slave BMS 12. Also, an opto-coupler as the wakeup apparatus 13 is connected to transmit a wakeup signal outputted from the master BMS 11 to each slave BMS 12.

An opto-coupler refers to a switching device including a light emitting source (input) and an optical detector (output). Generally, an infrared light emitting diode (LED) is used as the light emitting source, and a photodiode or a phototransistor that turns on by light is used as the optical detector. Thus, when current flows to the input side, the light emitting source emits light and the photodiode or phototransistor at the output side is turned on. That is, the switching device is turned on or off by light, rather than by electrical coupling.

The input side of the opto-coupler 13 is connected to the master BMS 11, and the output side is connected to the slave BMS 12. Thus, when the master BMS 11 outputs a wakeup signal, the wakeup signal is transmitted to the slave BMS 12 via the opto-coupler 13.

The use of the opto-coupler 13 to connect the master BMS 11 and the slave BMS 12 provides an advantage that the master BMS 11 and the slave BMS 12 are electrically isolated. As a result, at the same time of transmitting a wake up signal, a reverse current in which a high voltage current flowing from the battery pack 15 is input to the side of the master BMS 11 may be prevented, and an electromagnetic wave generated during charging/discharging of the battery pack 15 may be less influenced.

However, to enable the slave BMS 12 to wake up while maintaining the insulation between the master BMS 11 and the slave BMS 12, it requires as many opto-couplers 13 as there are slave BMSs in the battery pack 15 as shown in FIG. 1. Further, the opto-coupler 13 is a semiconductor device which means its cost is somewhat high, and when a plurality of the opto-couplers 13 is used, the total cost of the BMS or battery pack may increase. Accordingly, there is a need for research in waking up the slave BMS 12 while maintaining the insulation between the master BMS 11 and the slave BMS 12.

DISCLOSURE

Technical Problem

The present disclosure is designed to solve the problems of the related art, and therefore the present disclosure is directed to providing an apparatus for waking up a battery management system (BMS) that transmits a wakeup signal for waking up a multi-BMS.

Technical Solution

To achieve the object, there is provided an apparatus for waking up a multi-BMS of a battery pack including N battery modules (N is an integer greater than or equal to 2) that transmits a wakeup signal outputted from a master BMS to N slave BMSs to wake up the N slave BMSs managing each battery module in the battery pack, the apparatus including a series line connected between a high potential terminal and a low potential terminal of the battery pack to transmit the wakeup signal, an isolator connected on the series line and configured to turn on by the wakeup signal outputted from the master BMS, N−1 transistors connected to a higher potential than the isolator on the series line, each having two terminals other than a base terminal being connected on the series line and the base terminal being connected to each low potential of N−1 battery modules among the N battery modules, and a switch unit connected between the isolator and the high potential terminal of the battery module or between each transistor and each high potential terminal of the battery modules, and configured to transmit the wakeup signal to wake up the N slave BMSs by the turn-on operation of each transistor or the isolator.

According to one embodiment of the present disclosure, the isolator is an opto-coupler, and has an input-side terminal connected to the master BMS and an output-side terminal connected to the side of the series line.

According to one embodiment of the present disclosure, the transistor is of an NPN-type and has an emitter terminal connected to a low potential side on the series line. In this case, the apparatus for waking up a multi-BMS of a battery pack according to the present disclosure may further include a resistance element connected between the base terminal and the emitter terminal of the transistor.

The apparatus for waking up a multi-BMS of a battery pack according to the present disclosure may further include an overcurrent protection resistance element connected on the series line to protect the transistor or the isolator from overcurrent.

The apparatus for waking up a multi-BMS of a battery pack according to the present disclosure may further include a diode connected in a forward direction on the series line to prevent a reverse current.

According to one embodiment of the present disclosure, the switch unit may include a metal oxide semiconductor field effect transistor (MOSFET) having a source terminal and a gate terminal connected to apply the voltage outputted from a high potential terminal of each battery module, and a drain terminal connected to transmit the wakeup signal to the slave BMS when the transistor or the isolator is turned on. In this case, the apparatus according to the present disclosure may further include a resistance element connected between the source terminal and the gate terminal.

The apparatus for waking up a multi-BMS of a battery pack according to the present disclosure may be one component of a battery management system.

The apparatus for waking up a multi-BMS of a battery pack according to the present disclosure may be one component of a battery pack including a battery management system and a plurality of battery modules.

Advantageous Effects

According to one aspect of the present disclosure, a signal for waking up a plurality of slave BMSs may be transmitted by using a small number of isolators. Accordingly, a BMS or battery pack may reduce in costs.

According to another aspect of the present disclosure, a master BMS does not need all the number of input/output terminals corresponding to the number of slave BMSs, and thus the master BMS may reduce in size and manufacturing is simple and easy.

According to still another aspect of the present disclosure, an electrical isolation of a master BMS and a slave BMS may prevent a reverse current in which a high voltage current flowing from the battery pack is input to the side of the master BMS, and may less influence an electromagnetic wave generated during charging/discharging of the battery pack.

DESCRIPTION OF DRAWINGS

Other objects and aspects of the present disclosure will become apparent from the following descriptions of the embodiments with reference to the accompanying drawings in which.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
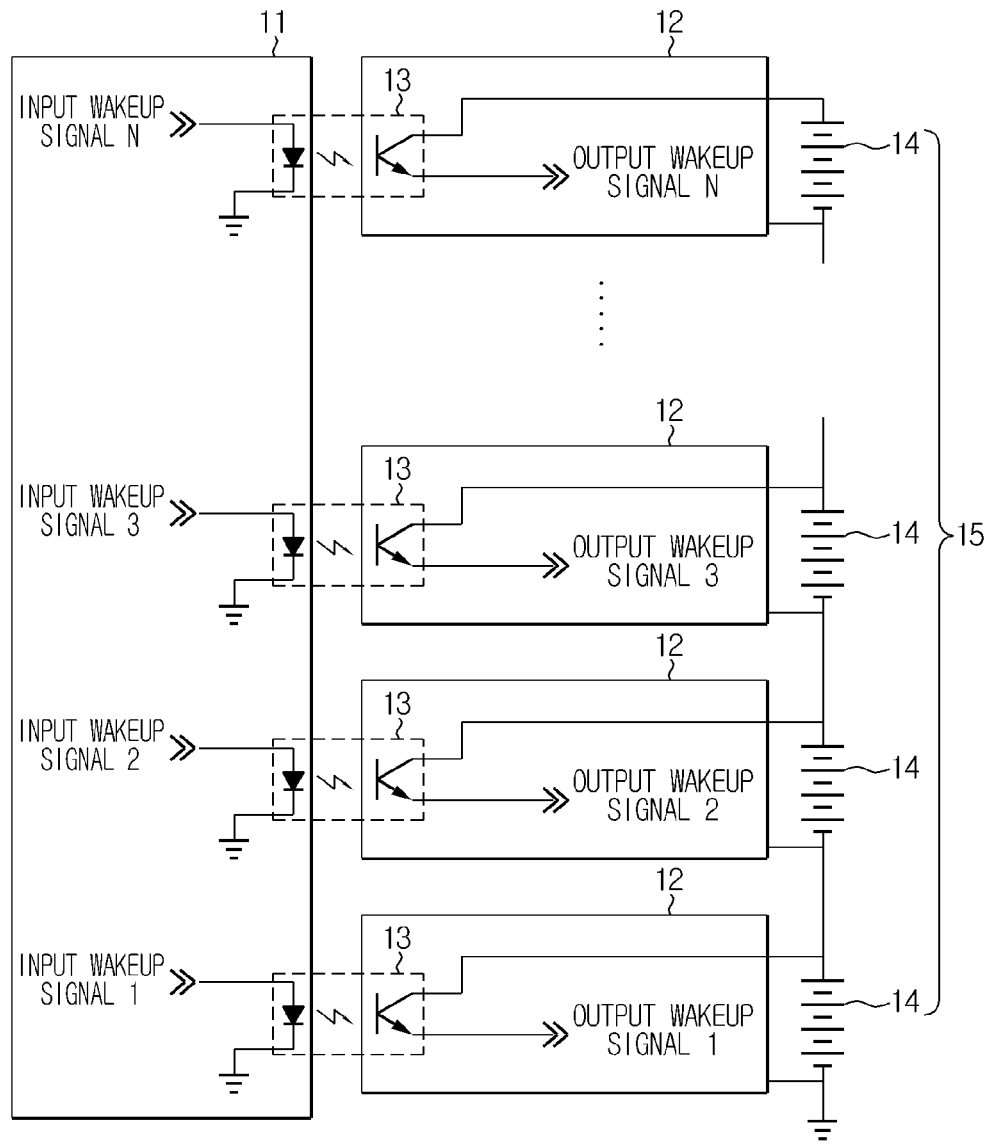
FIG. 1 is a schematic circuit diagram illustrating a wakeup apparatus for transmitting a wakeup signal outputted from a master BMS to a slave BMS according to a conventional art.
Figure 2:
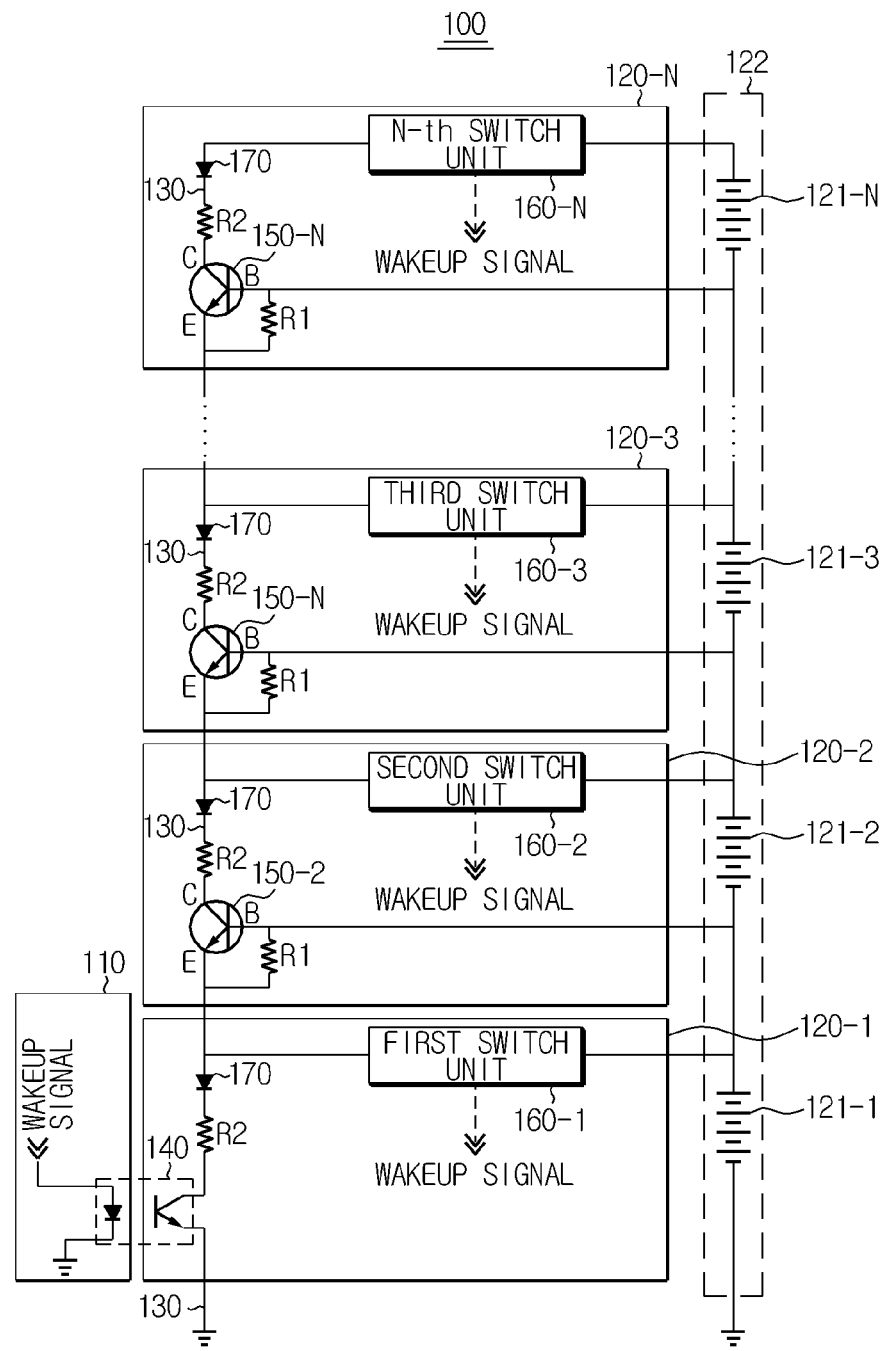
FIG. 2 is a schematic circuit diagram illustrating a configuration of an apparatus for waking up a multi-BMS of a battery pack according to an exemplary embodiment.

FIG. 2 is a schematic circuit diagram illustrating a configuration of an apparatus 100 for waking up a multi-BMS of a battery pack according to an exemplary embodiment, hereinafter referred to as a BMS wakeup apparatus.

Referring to FIG. 2, the BMS wakeup apparatus 100 according to an exemplary embodiment is connected between a master BMS 110 and a slave BMS 120. Also, the slave BMS 120 is connected to a battery pack 122 including N battery modules 121 (N is an integer greater than or equal to 2).

The slave BMS 120 monitors and controls a state of a secondary battery included in the battery module 121 by applying an algorithm for measurement of electrical characteristics such as charging/discharging currents or voltages of the battery module 121, charge/discharge control, voltage equalization control, state of charge (SOC) estimation, and the like. The master BMS 110 collects information about each battery module 121 from the slave BMS 120, and based on the collected information, controls the power supply to a load connected to the battery pack 122 and the output of a signal for waking up the slave BMS 120. To implement this, a communication network based on a known communication protocol may be connected between the master BMS 110 and the slave BMS 120 for data communication. However, for simplification of the drawing, the communication network is not shown. In addition, functions and roles of the master BMS 110 and the slave BMS 120 are known to a person having an ordinary skill in the art, and thus a detailed description is omitted herein.

Each battery module 121 includes at least one secondary battery cell, and the secondary battery cell is not limited to a specific type if it is rechargeable, and includes a lithium ion battery, a lithium polymer battery, a Ni—Cd battery, a Ni-MH battery, a Ni—Zn battery, and the like. The battery pack 122 is built by connecting the N battery modules 121. It is obvious that the number N of the battery modules 121 depends on an output voltage and a capacity required for the battery pack 122. Although FIG. 2 shows that all the N battery modules 121 of the battery pack 122 are connected in series, the connection of the battery modules 121 is not limited thereto. For example, the battery modules 121 may be connected in parallel or in series-parallel.

Meanwhile, a load that receives power from the battery pack 122 may be connected to the battery pack 122. The load is not limited to a specific type, and may include, for example, portable electronics such as a video camera, a mobile phone, a portable computer, a portable media player (PMP), an MP3 player, and the like, a motor of an electric vehicle (EV) or a hybrid electric vehicle (HEV), a power converter such as a DC-to-DC converter, and the like. The scope of the present invention is not limited by the type of the load.

The BMS wakeup apparatus 100 according to the present disclosure includes a series line 130, an isolator 140, a transistor 150, and a switch unit 160.

The series line 130 is connected between a high potential terminal and a low potential terminal of the battery pack 122. The series line 130 serves to transmit a wakeup signal outputted from the master. BMS 110, and allows the isolator 140, the transistor 150, and the switch unit 160 to connect to each other.

In the specification, for the convenience of description, the battery modules 121 in the battery pack 122 are referred to as a first battery module 121-1, a second battery module 121-2, a third battery module 121-3, ..., an N-th battery module 121-N in a sequential order from a low potential. Similarly, the slave BMSs 120 managing each of the battery modules 121 are also referred to as a first slave BMS 120-1, a second slave BMS 120-2, a third slave BMS 120-3, ..., an N-th slave BMS 120-N. Also, in the specification, the switch unit 160 corresponding to each of the slave BMSs 120 is referred to as a first switch unit 160-1, a second switch unit 160-2, a third switch unit 160-3, ..., an N-th switch unit 160-N. Also, in the specification, the transistor 150 corresponding to each of the battery modules 121 are referred to as a first transistor 150-1, a second transistor 150-2, a third transistor 150-3, ..., an N-th transistor 150-N.

The isolator 140 may be an opto-coupler. The opto-coupler may also be known as a photo-coupler or a photo MOS relay, and a function or a configuration of the isolator 140 is not influenced by its name. A configuration and a working principle of the opto-coupler are described in detail in the foregoing, and thus, a repeated description is omitted herein. The input side (light-emitting diode) of the opto-coupler is connected to the master BMS 110, and the output side (phototransistor) is connected to the series line 130.

The transistor 150 comprises N−1 transistors each corresponding to the slave BMSs 120. A general bipolar junction transistor consists of three terminals, that is, a collector, a base, and an emitter. Among them, the two terminals other than the base terminal B are connected on the series line 130, and the base terminal B is connected to a low potential terminal of the battery module 121 corresponding to each transistor 150.

According to an exemplary embodiment, the transistor 150 may be an NPN-type transistor. In this case, as shown in FIG. 2, the emitter terminal E is connected to a low potential side of the series line 130 (in a ground direction of the series line 130 in the drawing).

Also, a resistance terminal R1 may be connected between the base terminal B and the emitter terminal E of the transistor 150. The resistance terminal R1 serves to generate a potential difference between the base terminal B and the emitter terminal E.

The switch unit 160 is connected between the isolator 140 and a high potential terminal of the first battery module 121-1 or between the second to N-th transistors 150-2 to 150-N and high potential terminals of the second to N-th battery modules 121-2 to 121-N. Thus, when each transistor 150 or the isolator 140 is turned on, the switch unit 160 forms a closed circuit to allow current to flow. When the current from each battery module 121 flows to the switch unit 160 due to the closed circuit, a wakeup signal for waking up the N slave BMSs 120 is transmitted.

Each slave BMS 120 is awakened by the wakeup signal transmitted through the switch unit 160. In this instance, the wakeup signal may be inputted to a power manager (not shown) or a central controller (not shown) included in each slave BMS 120. The power manager or central controller included in the slave BMS 120 is a component or element that changes and manages the slave BMS 120 from a sleep state to an awake state in response to the wakeup signal. For example, the power manager or central controller may be implemented as a microprocessor that can execute a program code. In FIG. 2, however, for simplification of the drawing, an internal configuration of the master BMS 110 and the slave BMS 120 is not shown in detail.

Meanwhile, the BMS wakeup apparatus 100 according to the present disclosure may be incorporated in the master BMS 110 and/or the slave BMS 120, or may be provided separately outside of the master BMS 110 and/or the slave BMS 120. Although FIG. 2 shows that a majority of the BMS wakeup apparatus 100 is included in the slave BMS 120, the present disclosure is not limited to the embodiments illustrated in the drawings.

Hereinafter, a process of operation of the BMS wakeup apparatus 100 according to the present disclosure is described.

The isolator 140 such as the opto-coupler is in a turn-off state until current (signal) flows at the input side, and thus, the current does not flow at the output side. Accordingly, voltage outputted from the first battery module 121-1 is just applied to the first switch unit 160-1, but the current does not flow through the first switch unit 160-1.

Subsequently, the master BMS 110 inputs a wakeup signal to the input side of the isolator 140 to wake up the slave BMSs 120 from a sleep state. The wakeup signal enables the isolator 140 to turn on, and thereby a closed circuit is formed by association of the first battery module 121-1, the first switch unit 160-1, and the isolator 140. Accordingly, the current flows through the first switch unit 160-1, and the first switch unit 160-1 transmits the wakeup signal to the first slave BMS 120.

Meanwhile, as for the second transistor 150-2, voltage outputted from the second battery module 121-2 is applied to between a collector terminal C and a base terminal B of the second transistor 150-2. However, because an emitter terminal E is not connected to a low potential terminal of the series line 130 (a ground of the series line 130 in the drawing) before the isolator 140 is turned on, the second transistor 150-2 is also in a turn-off state.

Subsequently, when the isolator 140 is turned on, the emitter terminal E of the second transistor 150-2 is connected to the low potential terminal of the series line 130. Thereby, as the second transistor 150-2 is turned on, a closed circuit is formed by association of the second battery module 121-2, the second switch unit 160-2, and the second transistor 150-2. Thus, the current flows through the second switch unit 160-2, and the second switch unit 160-2 transmits the wakeup signal to the second slave BMS 120-2.

Similarly, as for the third transistor 150-3, because an emitter terminal E of the third transistor 150-3 is not connected to the low potential terminal of the series line 130 (the ground of the series line 130 in the drawing) before the isolator 140 and the second transistor 150-2 are turned on, the third transistor 150-3 is also in a turn-off state. Subsequently, as the isolator 140 and the second transistor 150-2 are turned on in a sequential order, the emitter terminal E of the third transistor 150-3 connects to the low potential terminal of the series line 130 (the ground of the series line 130 in the drawing). Thereby, as the third transistor 150-3 is turned on, a closed circuit is formed by association of the third battery module 121-3, the third switch unit 160-3, and the third transistor 150-3. Thus, the current flows through the third switch unit 160-3, and the third switch unit 160-3 transmits the wakeup signal to the third slave BMS 120-3.

Subsequently, likewise, each transistor 150 is turned on in a sequential order toward the high potential terminal of the series line 130, and at the same time, the current flows through each switch unit 160 corresponding to each transistor 150 being turned on. Then, each switch unit 160 transmits the wakeup signal to each slave BMS 120. Finally, the N-th transistor 150-N located at the highest potential side of the series line 130 is turned on and the N-th slave BMS 120-N is awakened, and accordingly, the BMS wakeup apparatus 100 according to the present disclosure completes its operation.

The wakeup signal is a one-time signal, and may be maintained in consideration of a period of time during which all the transistors 150 are turned on and a period of time during which all the transistors 150 transmit the wakeup signal to each slave BMS 120. Also, when the wakeup signal is input to the awakened slave BMS 120 again, each slave BMS 120 may recognize the wakeup signal as a signal for returning to a sleep state. In contrast, when the slave BMS 120 is a BMS operating only while an input of the wakeup signal is maintained, the master BMS 110 may continue to output the wakeup signal to enable the isolator 140 and the transistor 150 to maintain the turn-on state with an aim of continuous wakeup of the slave BMS 120. A person having an ordinary skill in the art may easily set the operation of the slave BMS 120 based on a number of times in which the wakeup signal is inputted, a period of time during which the wakeup signal is maintained, and a time at which the wakeup signal is inputted, and various design modifications may be made.

The BMS wakeup apparatus 100 according to the present disclosure may further include an overcurrent protection resistance element R2 connected on the series line 130 to protect the isolator 140 or the transistor 150 from overcurrent. The isolator 140 and the transistor 150 may be selected in consideration of voltage resistance performance to withstand the voltage of each battery module 121. However, in case the battery pack 122 is a high-capacity battery pack, the voltage outputted from each battery module 121 may be very high. In this case, the overcurrent protection resistance element R2 may be connected to prevent the isolator 140 or the transistor 150 from being damaged due to the high output voltage. It is obvious to a person having an ordinary skill in the art that a resistance value of the overcurrent protection resistance element R2 and a number of the overcurrent protection resistance elements R2 may be properly set depending on the output voltage of the battery module 121 and the voltage resistance performance of the isolator 140 or the transistor 150.

Also, the BMS wakeup apparatus 100 according to the present disclosure may further include a diode 170 connected in a forward direction on the series line 130 to prevent the current outputted from the battery module 121 from flowing in a backward direction (in a high potential direction of the series line 130).

According to an exemplary embodiment, the switch unit 160 may include a metal oxide semiconductor field effect transistor (MOSFET). The MOSFET is a semiconductor consisting of three terminals, that is, a source, a gate, and a drain. A structure and an operating principle of the MOSFET are widely known to a person having an ordinary skill in the art, and thus a detailed description is omitted herein.

Figure 3:
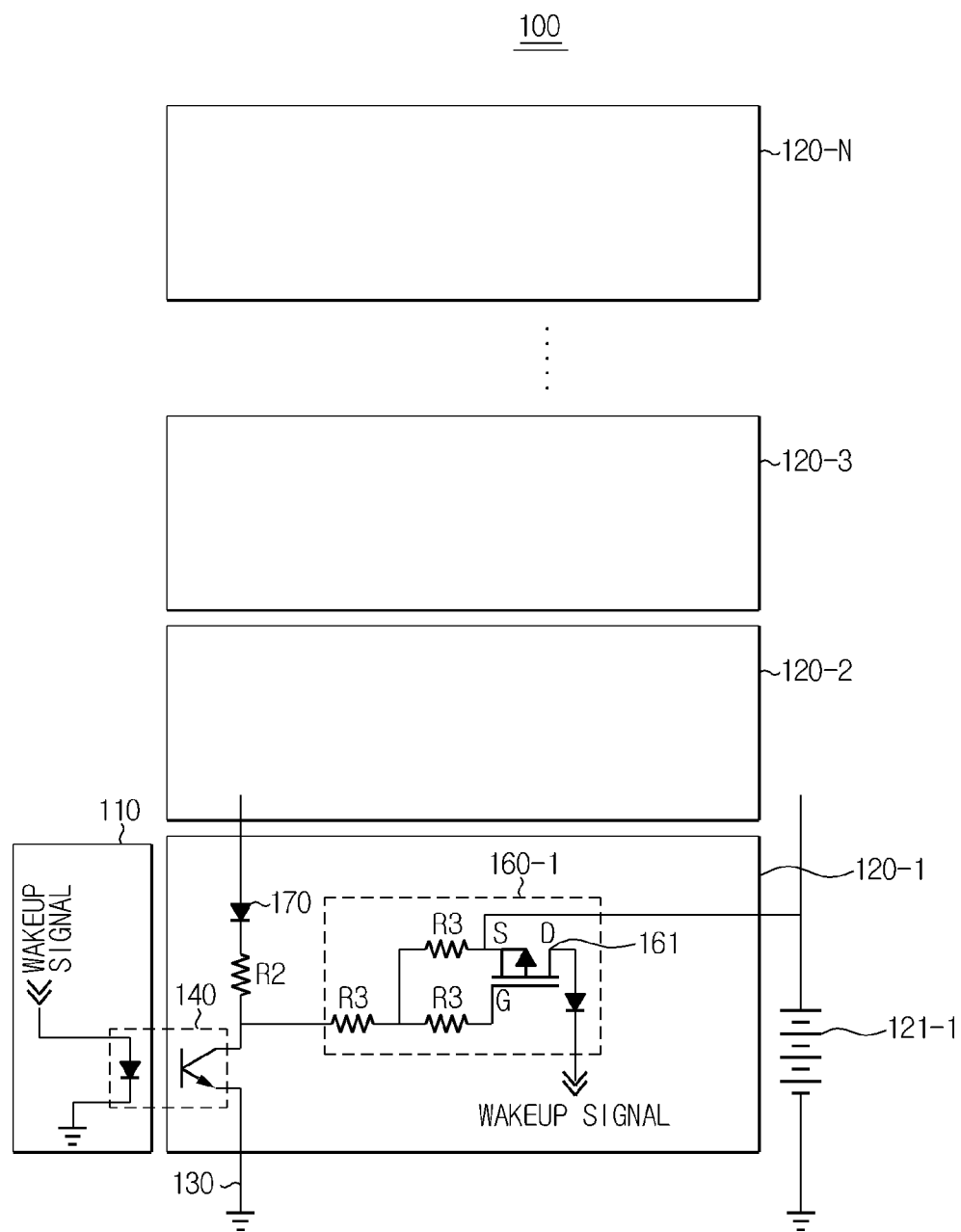
FIG. 3 is a schematic circuit diagram illustrating a structure of a switch unit including a MOSFET.

FIG. 3 is a schematic circuit diagram illustrating a structure of a switching unit 160 including a MOSFET 161.

Referring to FIG. 3, among the switching unit 160 shown in FIG. 2, only an internal structure of the first switch unit 160-1 is illustrated by way of example. A source terminal S and a gate terminal G of the MOSFET 161 are connected to apply voltage outputted from the high potential terminal of the first battery module 121-1. Also, a drain terminal D is connected to transmit the wakeup signal to the first slave BMS 120-1 when the isolator 140 is turned on. Also, a resistance element R3 is connected to generate a voltage difference between the source terminal S and the gate terminal G.

The MOSFET 161 does not form a closed circuit including the first switch unit 160-1 before the isolator 140 is turned on, and thus, the voltage of the first battery module 121-1 is applied to the source terminal S and the gate terminal G of the MOSFET 161 and a value of the applied voltage is the same. Accordingly, the MOSFET 161 maintains a turn off state.

Subsequently, a closed circuit including the first switch unit 160-1 is formed simultaneously with the turn-on of the isolator 140, and thus, current flows in between the source terminal S and the gate terminal G of the MOSFET 161. At the same time, a voltage difference is generated between the source terminal S and the gate terminal G of the MOSFET 161, and thereby, the MOSFET 161 is turned on. As a result, the current flows to the drain terminal D of the MOSFET 161. In this instance, the current flowing through the drain terminal functions as a wakeup signal for waking up the first slave BMS 120-1.

The configuration of the first switch unit 160-1 may be equally applied to the remaining switch unit 160. Meanwhile, the configuration of the switch unit 160 is just an exemplary embodiment, and the scope of the present disclosure is not limited by illustration. Also, it should be understood by a person having an ordinary skill in the art that the switch unit 160 includes all circuits configured to transmit the wakeup signal in response to the turn-on of the isolator 140 or the transistor 150.

Meanwhile, the BMS wakeup apparatus 100 according to the present disclosure may be one component of the BMS configured to monitor and control the state of the secondary battery by applying an algorithm for control of power supply to the load of the battery pack 122, measurement of electrical characteristics such as current or voltage, charge/discharge control, voltage equalization control, SOC estimation, and the like.

Also, the BMS wakeup apparatus 100 according to the present disclosure may be one component of the battery pack including the above BMS and the multiple battery modules.

According to the present disclosure, the signal for waking up the plurality of slave BMSs may be transmitted by using a small number of isolators. Accordingly, the BMS or the battery pack may reduce in costs. Also, the master BMS does not need all the number of input/output terminals corresponding to the number of slave BMSs, and thus the master BMS may reduce in size and manufacturing is simple and easy. Further, electrical isolation of the master BMS and the slave BMS may prevent a reverse current in which a high voltage current flowing from the battery pack 15 is input to the side of the master BMS 11, and less influence an electromagnetic wave generated during charging/discharging of the battery pack 15.

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

What is claimed is:

1. An apparatus for waking up a multi-BMS of a battery pack including N battery modules that transmits a wakeup signal output from a master BMS to N slave BMSs to wake up the N slave BMSs managing each battery module in the battery pack, the apparatus comprising:
    a series line connected between a high potential terminal and a low potential terminal of the battery pack to transmit the wakeup signal;
    an isolator connected on the series line and configured to turn on by the wakeup signal output from the master BMS;
    N−1 transistors connected to a higher potential than the isolator on the series line, each having two terminals other than a base terminal being connected on the series line and the base terminal being connected to each low potential terminal of N−1 battery modules among the N battery modules; and
    a switch unit connected between the isolator and the high potential terminal of the battery module or between each transistor and each high potential terminal of the battery modules, and configured to transmit the wakeup signal to wake up the N slave BMSs by the turn-on operation of each transistor or the isolator,
    wherein N is an integer greater than or equal to 2.

2. The apparatus according to claim 1, wherein the isolator is an opto-coupler, and has an input-side terminal connected to the master BMS and an output-side terminal connected to a side of the series line.

3. The apparatus according to claim 1, wherein the transistor is of an NPN-type and has an emitter terminal connected to a low potential side on the series line.

4. The apparatus according to claim 3, further comprising:
    a resistance element connected between the base terminal and the emitter terminal of the transistor.

5. The apparatus according to claim 1, further comprising:
    an overcurrent protection resistance element connected on the series line to protect a corresponding transistor or the isolator from overcurrent.

6. The apparatus according to claim 1, further comprising:
    a diode connected in a forward direction on the series line to prevent a reverse current.

7. The apparatus according to claim 1, wherein the switch unit includes a metal oxide semiconductor field effect transistor having a source terminal and a gate terminal connected to apply voltage output from a high potential terminal of each battery module, and a drain terminal connected to transmit the wakeup signal to the slave BMS when the transistor or the isolator is turned on.

8. The apparatus according to claim 7, further comprising:
    a resistance element connected between the source terminal and the gate terminal.

9. A battery management system comprising an apparatus for waking up a multi-BMS of a battery pack according to claim 1.

10. A battery pack comprising:
    a battery management system according to claim 9; and
    a plurality of battery modules.

* * * * *